United States Patent [19]

Sunagawa et al.

[11] Patent Number: 4,833,561
[45] Date of Patent: May 23, 1989

[54] PICKUP APPARATUS FOR MAGNETO-OPTICAL RECORDING MEDIUM

[75] Inventors: Hiroshi Sunagawa; Hiroshi Nishihara; Toshiaki Suhara, all of Kanagawa, Japan

[73] Assignee: Fuji Photo Film Co., Ltd., Kanagawa, Japan

[21] Appl. No.: 150,961

[22] Filed: Feb. 1, 1988

[30] Foreign Application Priority Data

Jan. 30, 1987 [JP] Japan ................................. 62-19926

[51] Int. Cl.$^4$ ..................... G11B 7/135; G11B 11/10
[52] U.S. Cl. ..................................... 360/114; 369/13; 369/44; 369/45; 369/46
[58] Field of Search ............... 360/114; 369/13, 43–46, 369/112

[56] References Cited

U.S. PATENT DOCUMENTS

| | | | |
|---|---|---|---|
| 4,165,519 | 8/1979 | Goto | 358/128 |
| 4,358,200 | 11/1982 | Heemskerk et al. | 369/45 |
| 4,498,159 | 2/1985 | Daimon | 369/44 |
| 4,532,522 | 7/1985 | Tsunoda et al. | 369/46 |
| 4,633,450 | 12/1986 | Gueugnon | 360/114 |
| 4,733,065 | 3/1988 | Hoshi et al. | 369/45 |
| 4,785,438 | 11/1988 | Mizunde | 360/114 |

FOREIGN PATENT DOCUMENTS 3522849 1/1988 Fed. Rep. of Germany .

Primary Examiner—Robert S. Tupper
Attorney, Agent, or Firm—Sughrue, Mion, Zinn, Macpeak & Seas

[57] ABSTRACT

A pickup apparatus for a magneto-optical recording medium comprises an optical waveguide for receiving a light beam reflected by a magneto-optical recording medium, and first and second focusing grating couplers disposed side by side on the optical waveguide for introducing the reflected light beam into the optical waveguide by exciting the same guided mode, and converging the guided optical waves. A third focusing grating coupler is disposed for introducing the reflected light beam into the optical waveguide in a different guided mode and converging the guided optical wave. First, second and third photodetectors are secured to the optical waveguide for respectively detecting the optical waves converged by the first, second and third focusing grating couplers. Tracking error and focusing error are detected based on the outputs of the first and second photodetectors, and recorded signals are detected based on a difference between the output of the first and/or second photodetector and an output of the third photodetector.

26 Claims, 6 Drawing Sheets

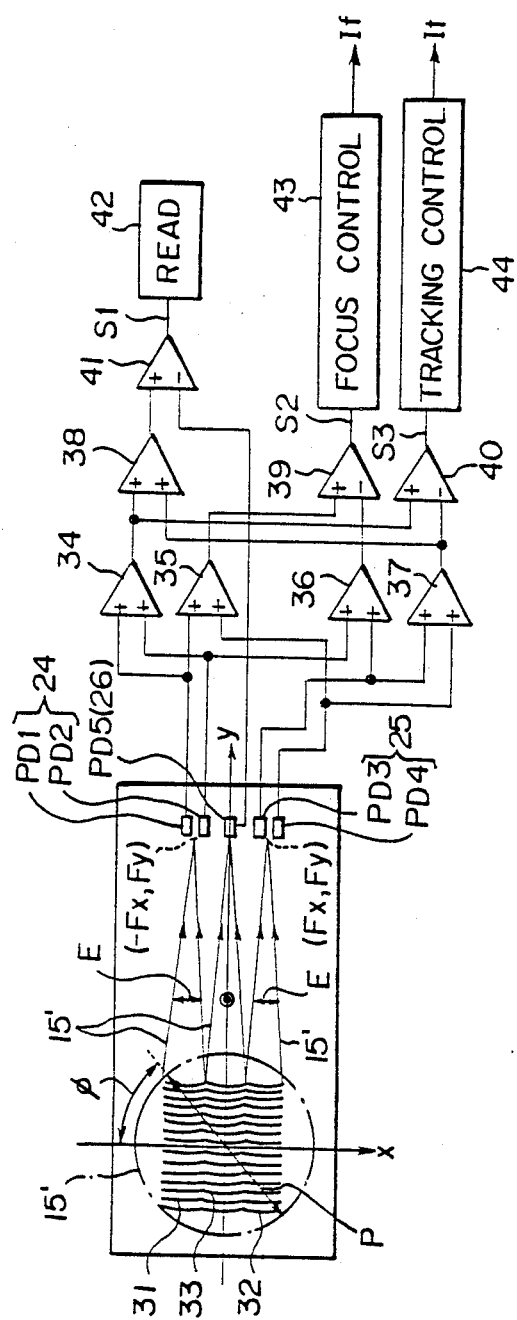

PICKUP APPARATUS FOR MAGNETO-OPTICAL RECORDING MEDIUM

BACKGROUND OF THE INVENTION

1. Field of the Invention

This invention relates to a pickup apparatus for detecting (reading out) signals recorded on a magneto-optical recording medium such as a magneto-optical disk. This invention particularly relates to a pickup apparatus using an optical waveguide.

2. Description of the Prior Art

In recent years, magneto-optical recording media such as magneto-optical disks are widely used as recording media for image signals, audio signals or the like. Signals recorded on the magneto-optical recording medium in terms of directions of magnetization are detected by use of an optical pickup apparatus. The optical pickup apparats is constituted to irradiate, for example, linearly polarized light such as a laser beam to the surface of the magneto-optical recording medium, and to detect the directions of magnetization on the magneto-optical recording medium by utilization of the magnetic Kerr effects with which the plane of polarization of the light reflected by the magneto-optical recording medium is rotated in accordance with the direction of magnetization.

Specifically, with the pickup apparatus for the magneto-optical recording medium, the light reflected by the magneto-optical recording medium is detected by a photodetector via an analyzer, and the directions of magnetization, i.e. the recorded signals, are detected by utilizing such effects that the detected optical amounts change in accordance with the rotation of the plane of polarization of the reflected light. Besides the function of carrying out detection of the recorded signals as mentioned above, the pickup apparatus is required to have the function of detecting tracking error, i.e. the function of detecting whether the light beam for the detection of the condition of magnetization is deviated rightward or leftward from the center of a track along a predetermined groove, and the function of detecting focusing error, i.e. the function of detecting whether the focusing point of the light beam is deviated forward or backward from the reflection surface of the magneto-optical recording medium. A signal representing the tracking error or the focusing error is utilized to control tracking or focusing so that the signal is canceled, thereby to irradiate the light beam accurately to the predetermined track or to focus the light beam accurately onto the reflection surface of the magneto-optical recording medium. As the method of detecting a tracking error, there have heretofore been known the push-pull technique, the heterodyning technique, temporal (time difference) detection technique and other such techniques. On the other hand, as the method of detecting a focusing error, there have heretofore been known the astigmatism technique, the critical angle detection technique, the Foucault technique and other such techniques.

In order to provide the aforesaid functions together with the signal detecting function, the conventional pickup apparatus for a magneto-optical recording medium is composed of small optical elements such as a beam splitter for splitting a light beam reflected by a magneto-optical recording medium from the light beam irradiated onto the magneto-optical recording medium, a lens for converging the reflected light beam in the vicinity of a photodetector such as a photodiode, the aforesaid analyzer, and a prism for carrying out the tracking error detecting method and the focusing error detecting method.

However, the aforesaid small optical elements require accurate machining or processing, and troublesome adjustment of positions of the small optical elements with respect to each another must be carried out at the time of assembling the pickup apparatus. Therefore, the pickup apparatus using such optical elements naturally becomes expensive. Also, the pickup apparatus having the configuration as mentioned above is large and heavy, and therefore is disadvantageous from the viewpoint of making the read-out apparatus small and light and shortening the access time. Particularly, in the case where differential detection for improvement of the S/N ratio of the read-out signals is carried out, a semi-transparent mirror or the like is necessary for splitting the reflected light beam into two beams, and some optical systems for the differential detection require two analyzers. Therefore, in this case, the pickup apparatus becomes more complicated, larger and heavier.

Accordingly, various attempts have heretofore been made to eliminate the aforesaid drawbacks of the conventional pickup apparatus by simplifying the configuration of the pickup apparatus by use of, for example, a special optical element such as an aspherical lens. However, the optical element of this type is very expensive, and therefore the cost of the pickup apparatus using such an optical element does not become much lower than the cost of the aforesaid pickup apparatus even though the configuration is simplified.

SUMMARY OF THE INVENTION

The primary object of the present invention is to provide a pickup apparatus for a magneto-optical recording medium, which is small and light.

Another object of the present invention is to provide a pickup apparatus for a magneto-optical recording medium, which is fabricated with a very low cost.

The present invention provides a pickup apparatus for a magneto-optical recording medium, which comprises:

(i) a light source for irradiating a linearly polarized light beam onto a surface of a magneto-optical recording medium, (ii) an objective lens for converging said light beam onto the reflection surface of said magneto-optical recording medium, (iii) an optical waveguide disposed in such a direction that one surface thereof receives the light beam reflected by said magneto-optical recording medium, (iv) a first focusing grating coupler and a second focusing grating coupler disposed side by side at an incidence position of said reflected light beam on the surface of said optical waveguide so that an axis passing through approximately the center of said reflected light beam and extending on said surface of said optical waveguide approximately normal to a tracking direction intervenes between said first focusing grating coupler and said second focusing grating coupler, said first focusing grating coupler and said second focusing grating coupler respectively making said reflected light beam enter said optical waveguide by exciting either one of a TE guided mode and a TM guided mode, and respectively converging the optical waves, which are thus guided through said optical waveguide in the guided modes identical with each other, to positions spaced from each other with said axis intervening therebetween, (v) a third focusing grating coupler disposed side by side with said first focusing grating coupler and said second focusing grating coupler at the incidence position of said reflected light beam on the surface of said optical waveguide, said third focusing grating coupler making said reflected light beam enter said optical waveguide by exciting a guided mode different from said guided modes of said first focusing grating coupler and said second focusing grating coupler, and converging the optical wave, which is thus guided through said optical waveguide, in said optical waveguide, (vi) a first photodetector, a second photodetector, and a third photodetector secured to the surface or an edge face of said optical waveguide for respectively detecting the optical wave converged by said first focusing grating coupler, the optical wave converged by said second focusing grating coupler, and the optical wave converged by said third focusing grating coupler, (vii) an error detection circuit for carrying out detection of tracking error add detection of focusing error on the basis of outputs of said first photodetector and said second photodetector, and (viii) a differential detection circuit for detecting signals recorded on said magneto-optical recording medium on the basis of a difference between the output of said first photodetector and/or the output of said second photodetector on one hand and an output of said third photodetector on the other hand.

With the pickup apparatus for a magneto-optical recording medium in accordance with the present invention, the effects of the optical elements such as a beam splitter, a lens, a prism, an analyzer and a semitransparent mirror for carrying out differential detection and focusing-and-tracking-error detection in the conventional pickup apparatus are achieved by the focusing grating couplers formed on the optical waveguide. Therefore, the pickup apparatus for a magneto-optical recording medium in accordance with the present invention can be fabricated small and light with a very small number of parts. Accordingly, the cost of the apparatus becomes markedly lower and the access time can be shortened as compared with the conventional pickup apparatus.

Also, the major part of the pickup apparatus for a magneto-optical recording medium in accordance with the present invention can be readily mass-produced by a planar technique. This feature also contributes to reduction in the cost of the apparatus.

The pickup apparatus for a magneto-optical recording medium in accordance with the present invention is free from adjustment of positions of the optical elements as in the conventional pickup apparatus. Also, with the pickup apparatus for a magneto-optical recording medium in accordance with the present invention wherein the photodetectors are coupled with the optical waveguide, it is not necessary to carry out adjustment of the positions of the photodetectors with respect to the optical elements. These features also contribute to reduction in the cost of the apparatus.

Each of the first, second and third focusing grating couplers is a diffraction grating having a curvature or a curvature and "chirp". The focusing grating coupler directly couples the wave surface outside of the optical waveguide with the wave front of the optical wave guided inside of the optical waveguide, and converges the guided optical wave in the optical waveguide.

The light beam reflected by the magneto-optical recording medium is introduced by the focusing grating couplers into the optical waveguide, and is thus separated from the optical path of the light beam advancing from the light source toward the magneto-optical recording medium. This effect is the same as the effect of the beam splitter in the conventional pickup apparatus. Also, the focusing grating couplers converge the guided optical waves (reflected light beam) in the optical waveguide. The converging effect of the focusing grating couplers is the same as the effect of the lens in the conventional pickup apparatus. Further, since the first focusing grating coupler and the second focusing grating coupler are disposed at the positions as mentioned above, the light beam reflected by the magneto-optical recording medium and incident upon the focusing grating couplers is separated into two guided optical waves in the tracking direction and converged onto two spots. This effect is the same as the effect of the prism in the conventional pickup apparatus.

Also, the first focusing grating coupler and the second focusing grating coupler are formed to excite the TE guided mode or the TM guided mode, and the third focusing grating coupler is formed to excite the TM guided mode in the case where the first focusing grating coupler and the second focusing grating coupler excite the TE guided mode, or to excite the TE guided mode in the case where the first focusing grating coupler and the second focusing grating coupler excite the TM guided mode. As a result, the output of the first photodetector and/or the second photodetector and the output of the third photodetector change complimentarily in accordance with the direction of polarization of the reflected light beam. Therefore, the direction of polarization of the reflected light beam, i.e. the signal recorded on the magneto-optical recording medium can be detected by detecting the deference between the two outputs by use of the differential detection circuit. In this manner, read-out signals of a high S/N ratio can be obtained as in the case where differential detection is carried out by use of the differential detection optical system. Specifically, as the third focusing grating coupler is provided together with the first focusing grating coupler and the second focusing grating coupler, the beam splitting effect can be obtained in the same manner as the semitransparent mirror. Also, since guided modes which the respective focusing grating couplers excite are adjusted in the manner as mentioned above, the same effect as the two analyzers can be obtained.

BRIEF DESCRIPTION OF THE DRAWINGS

FIG. 2 is a schematic view showing the top plan shape of the optical waveguide in the embodiment shown in FIG. 1 and the electric circuit used for the embodiment.

DESCRIPTION OF THE PREFERRED EMBODIMENTS

The present invention will hereinbelow be described in further detail with reference to the accompanying drawings.

Figure 1:
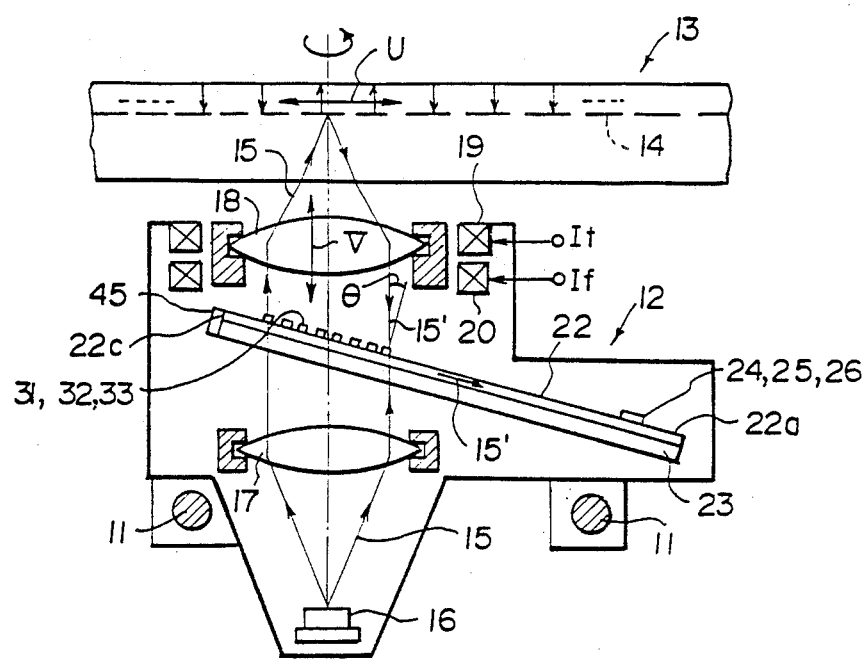
FIG. 1 is a side view showing an embodiment of the pickup apparatus for a magneto-optical recording medium in accordance with the present invention.

FIG. 1 shows an embodiment of the pickup apparatus for a magneto-optical recording medium in accordance with the present invention, and FIG. 2 shows the top plan view of an optical waveguide in the embodiment shown in FIG. 1 and an electric circuit used for the embodiment shown in FIG. 1. As shown in FIG. 1, the pickup apparatus is provided with rods 11, 11 extending at an angle approximately normal to the drawing sheet in FIG. 1, and a block 12 moveable along the rods 11, 11. In order to follow along a signal string (track) along a predetermined groove, the block 12 is moved normal to or approximately normal to the direction of the track (i.e. the direction as indicated by the arrow U at the light beam incidence position) by, for example, a precision feed screw and an optical system feed motor.

The block 12 is provided with a semiconductor laser 16 for irradiating a linearly polarized light beam (a laser beam) 15 to a reflection surface 14 of a magneto-optical disk 13, a collimator lens 17 for collimating the divergent light beam 15 emitted by the semiconductor laser 16, and an objective lens 18 for converging the collimated light beam 15 onto the reflection surface 14 of the optical disk 13. For the purposes of tracking control and focusing control as will be described later, the objective lens 18 is supported moveably in a tracking direction normal to the direction as indicated by the arrow U and in a focusing direction as indicated by the arrow V, and is moved in these directions by a tracking coil 19 and a focusing coil 20.

An optical waveguide 22 is disposed between the collimator lens 17 and the objective lens 18 in such a direction that a surface 22a of the optical waveguide 22 receives a light beam 15' reflected by the magneto-optical disk 13. The optical waveguide 22 is formed on a transparent support 23. Also, a first focusing grating coupler 31, a second focusing grating coupler 32 and a third focusing grating coupler 33 are disposed adjacent to one another on the surface 22a of the optical waveguide 22 at the position upon which the reflected light beam 15' impinges. (The focusing grating coupler will hereinafter be abbreviated to FGC.) Each of the first FGC 31, the second FGC 32 and the third FGC 33 is a diffraction grating having a curvature or a curvature and "chirp". The first FGC 31, the second FGC 32 and the third FGC 33 respectively introduce the reflected light beam 15' into the optical waveguide 22 and converge the reflected light beam 15' (optical waves 15', 15', 15') thus guided through the optical waveguide 22 into a single spot in the optical waveguide 22. As shown in FIG. 2, the first FGC 31 and the second FGC 32 are disposed side by side so that a y axis on the optical waveguide 22 normal to the aforesaid tracking direction and passing through nearly the center of the reflected light beam 15' intervenes between the FGC 31 and the FGC 32. Also, the FGC 31 and the FGC 32 are formed to converge the optical waves 15', 15' to positions spaced from each other with the y axis intervening therebetween. The third FGC 33 is provided between the first FGC 31 and the second FGC 32 side by side therewith.

When positions on the optical waveguide 22 are defined by the y axis and an x axis, i.e. the axis in the tracking direction, in FIG. 2 and coordinates of the optical wave converging positions by the FGC 31 and the FGC 32 are respectively expressed as $(-Fx, Fy)$ and $(Fx, Fy)$, an m'th grating pattern of each of the FGC 31 and the FGC 32 having the aforesaid effects is expressed as $$y \sin\theta + N_{TE}\sqrt{(x \mp Fx)^2 + (y - Fy)^2} = m\lambda + \text{const.}$$

(double signs: "−" for the FGC 31, "+" for the FGC 32)
where $\lambda$ denotes the optical wavelength of the reflected light beam 15', $\theta$ denotes the angle of incidence of the reflected light beam 15' upon the FGC 31 and the FGC 32, and $N_{TE}$ denotes the effective refractive index of the optical waveguide 22 with respect to the TE mode optical wave.

On the other hand, when coordinates of the optical wave converging position by the FGC 33 are expressed as $(0, Fy)$, an m'th grating pattern of the FGC 33 is expressed as $$y \sin\theta + N_{TM}\sqrt{x^2 + (y - Fy)^2} = m\lambda + \text{const.}$$

where $N_{TM}$ denotes the effective refractive index of the optical waveguide 22 with respect to the TM mode optical wave, and the other factors are as defined above.

Also, grating pitches of the first FGC 31, the second FGC 32 and the third FGC 33 are adjusted so that the first FGC 31 and the second FGC 32 excite the TE guided mode, and the third FGC 33 excite the TM guided mode. As shown in FIG. 2, the optical waveguide 22 is disposed so that the x axis is inclined at an angle of 45° with respect to the direction of linear polarization of the reflected light beam 15' as indicated by the arrow P. The direction of linear polarization of the reflected light beam 15' rotates in accordance with the direction of magnetization in the magneto-optical disk 13. Therefore, in this embodiment, the direction of linear polarization of the light beam 15' reflected by an un-magnetized part is taken as a reference, and the optical waveguide 22 is disposed so that the x axis makes an angle of 45° with respect to said reference direction of linear polarization.

The optical waveguide 22 may be formed by, for example, sputtering #7059 glass onto the support 23 made of pyrex glass. On the other hand, the FGC 31, the FGC 32 and the FGC 33 may be formed by, for example, forming a Si—N film on the optical waveguide 22 by PCVD (plasma-enhanced chemical vapor deposition), forming a resist pattern by the electron beam direct drawing method, and then transferring the pattern to the Si—N film by RIE. By way of example, in the case where the optical waveguide 22, the FGC 31, the FGC 32 and the FGC 33 are formed of the aforesaid materials, the center period of each of the FGC 31 and the FGC 32 which excite the TE guided mode and which have the grating patterns as defined by the aforesaid pattern formulas is 0.791 μm, and the center period of the FGC 33 which excites the TM guided mode is 0.797 μm.

Figure 3:
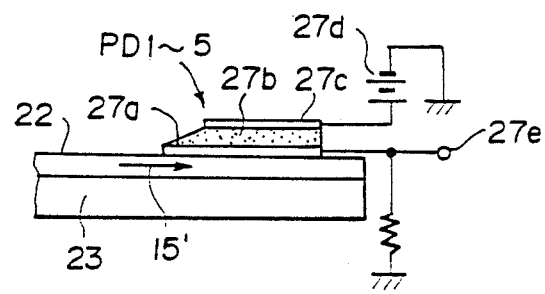
FIG. 3 is a side view showing the photodetector in the embodiment shown in FIG. 1, FIGS. 4 and 5 are side views showing further embodiments of the pickup apparatus for a magneto-optical recording medium in accordance with the present invention.

On the other hand, a first photodetector 24, a second photodetector 25 and a third photodetector 26 are disposed on the surface 22a of the optical waveguide 22 for respectively detecting the optical waves 15', 15', 15' converged in the manner as mentioned above. By way of example, the first photodetector 24 is composed of photodiodes PD1 and PD2 divided from each other by a gap extending in parallel with the y axis, and the second photodetector 25 is composed of photodiodes PD3 and PD4 divided from each other by a gap extending in parallel with the y axis. On the other hand, the third photodetector 26 is composed of a single photodiode PD5. As shown in detail in FIG. 3, each of the photodiodes PD1 to PD5 is formed by, for example, stacking a lower transparent electrode 27a, a thin film-like photoconductive material 27b, and an upper electrode 27c in this order on the optical waveguide 22. Also, an electric power source 27d is connected to apply a predetermined electric field between the lower transparent electrode 27a and the upper electrode 27c. With the photodiodes PD1 to PD5 having the configuration as mentioned above, when the photoconductive material 27b is exposed to light, a photocurrent of a level proportional to the amount of light flows through the photoconductive material 27b. Therefore, the amount of light which the photoconductive material 27b receives can be detected by detecting the level of the electric current flowing through an external circuit via a terminal 27e. The thin film-like photoconductive material 27b may be constituted by, for example, an epitaxial film, a polycrystalline film or an amorphous film formed of Si or Ge as an element of Group IV of the periodic table, Se as an element of Group VI, GaAs of Groups III and V, ZnO or CdS of groups II and VI, or PbS of Groups IV and VI. The thin film-like photoconductive material 27b may also be constituted by a film forming a photodiode by generating the p-n junction or the p-i-n junction by the addition of atoms (B, P or the like) of the Group III or Group V to an amorphous calcogen film (a—Se, a—Se—As—Te or the like) or a film containing amorphous Si as the main constituent and also containing hydrogen and/or fluorine (a-Si:H, a-SiGe:H, a-SiC:H or the like), or by a film forming a photodiode by use of the film containing amorphous Si as the main constituent and also containing hydrogen and/or fluorine and an electrode constituting the Schottky junction.

As shown in FIG. 2, the outputs of the photodiodes PD1 and PD2 are added together by an addition amplifier 34, and the outputs of the photodiodes PD3 and PD4 are added together by an addition amplifier 37. Also, the output of the outer photodiode PD1 of the first photodetector 24 and the output of the outer photodiode PD4 of the second photodetector 25 are added together by an addition amplifier 35, and the outputs of the inner photodiodes PD2 and PD3 are added together by an addition amplifier 36. The outputs of the addition amplifiers 34 and 37 are fed to an addition amplifier 38 and a differential amplifier 40, and the outputs of the addition amplifiers 35 and 36 are fed to a differential amplifier 39. The output of the addition amplifier 38 and the output of the photodiode PD5 are fed to a differential amplifier 41. An output S1 of the differential amplifier 41, an output S2 of the differential amplifier 39, and an output S3 of the differential amplifier 40 are respectively fed to a read-out circuit 42, a focusing coil drive control circuit 43 and a tracking coil drive control circuit 44.

Operations of the optical pickup apparatus having the configuration as mentioned above will be described hereinbelow. The light beam (laser beam) 15 emitted by the semiconductor laser 16 and collimated by the collimator lens 17 passes through the support 23 and the optical waveguide 22, and is converged by the objective lens 18 so that the light beam 15 is focused on the reflection surface 14 of the magneto-optical disk 13. The magneto-optical disk 13 is rotated by a rotation drive means (not shown) so that the track is moved in the direction as indicated by the arrow U at the incidence position of the light beam 15. As is well known, the track is a string of image signals, audio signals or the like recorded by use of the directions of magnetization as indicated by the arrows above the reflection surface 14 in FIG. 1. As the direction of magnetization is reversed, the direction of linear polarization of the light beam 15' reflected by the magneto-optical disk 13 rotates reversely with respect to the direction of linear polarization of the light beam 15' reflected by the un-magnetized part. Specifically, the direction of linear polarization of the light beam 15' reflected by the part of the magneto-optical disk 13 magnetized in a direction rotates clockwise from the direction of polarization as indicated by the arrow P in FIG. 2, and the direction of linear polarization of the light beam 15' reflected by the part of the magneto-optical disk 13 magnetized in the reverse direction rotates counter-clockwise from the direction of polarization as indicated by the arrow P.

The reflected light beam 15' passes through the objective lens 18, and is introduced into the optical waveguide 22 by the FGC 31, the FGC 32, and the FGC 33. The optical waves 15', 15', 15' (reflected light beam 15') guided through the optical waveguide 22 are converged into two spots with the y axis intervening therebetween and into a single spot on the y axis by the beam converging effects of the FGC 31, the FGC 32 and the FGC 33. The first FGC 31 and the second FGC 32 are formed to excite the TE guided mode as mentioned above, and guide the optical waves having the electric field vectors in the directions as indicated by the arrows E, E in FIG. 2 through the optical waveguide 22. On the other hand, the third FGC 33 is formed to excite the TM guided mode, and guide the optical wave having the electric field vector at an angle normal to the drawing sheet in FIG. 2 through the optical waveguide 22. Therefore, when the direction of linear polarization of the reflected light beam 15' rotates clockwise from the direction of polarization as indicated by the arrow P, the optical amount of the reflected light beam 15' introduced by the third FGC 33 into the optical waveguide 22 increases, whereas the optical amounts of the reflected light beam 15' introduced by the first FGC 31 and the second FGC 32 into the optical waveguide 22 decrease. When the direction of linear polarization of the reflected light beam 15' rotates counter-clockwise from the direction of polarization as indicated by the arrow P, the optical amount of the reflected light beam 15' introduced by the third FGC 33 into the optical waveguide 22 decreases, whereas the optical amounts of the reflected light beam 15' introduced by the first FGC 31 and the second FGC 32 into the optical waveguide 22 increase. More specifically, in the case where the angle of the direction of linear polarization of the reflected light beam 15' with respect to the x axis as shown in FIG. 2 is $\phi$, and the aperture area of the FGC 31 or the FGC 32 and the aperture area of the FGC 33 are equal to each other, the optical amount I1 introduced by the FGC 31 or the FGC 32 into the optical waveguide 22 and the optical amount I2 introduced by the FGC 33 into the optical waveguide 22 change in proportion to $\cos^2 \phi$ and $\sin^2 \phi$ as indicated by curves (1) and (2) in FIG. 9. Namely, when the angle $\phi$ is smaller than 45°, the optical amount I1 introduced by the FGC 31 or the FGC 32 into the optical waveguide 22 is larger than the optical amount I2 introduced by the FGC 33 into the optical waveguide 22. When the angle $\phi$ exceeds 45°, the aforesaid relationship is reversed. Therefore, by way of example, in the case where the gain of the addition amplifier 38 is adjusted to an appropriate value, the output of the differential amplifier 41 can be made "−" (minus) at the time the direction of linear polarization of the reflected light beam 15' is rotated clockwise from the direction as indicated by the arrow P in FIG. 2, and the output of the differential amplifier 41 can be made "+" (plus) at the time the direction of linear polarization of the reflected light beam 15' is rotated counter-clockwise from the direction as indicated by the arrow P. Accordingly by discriminating the output S1 of the differential amplifier 41, the directions of magnetization of the magneto-optical disk 13, i.e. the recorded signals, can be detected.

The detection signals generated by the first photodetector 24, the second photodetector 25 and the third photodetector 26 often include noise caused by, for example, fluctuations in optical intensity of the semiconductor laser 16, fluctuations in reflectivity of the recording magnetic film of the magneto-optical disk 13, and the crystal grains. The noise components are in phase with each other between the outputs of the first photodetector 24 and the second photodetector 25 on one hand, and the output of the third photodetector 26 on the other hand. Therefore, by carrying out the differential detection of the signal components in the manner as mentioned above, the noise components are canceled, and read-out signals S1 having a high S/N ratio can be obtained.

Figure 9:
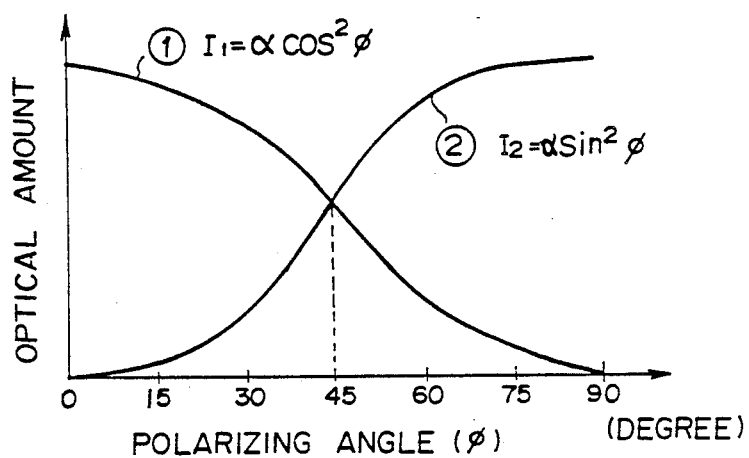
FIG. 9 is a graph showing the relationship between the angle of the plane of linear polarization of the reflected light beam and the optical amount introduced by the focusing grating coupler into the optical waveguide.

Also, as clear from FIG. 9, in the case where the change width of the angle $\phi$ is constant, the change amounts of the optical amounts I1 and I2 are the largest and the differential output S1 is the largest when the middle of the change is at $\phi=45°$. Therefore, even though the rotation angle (Kerr rotation angle) of the plane of linear polarization of the reflected light beam 15' caused by the difference in the direction of magnetization of the magneto-optical disk 13 is markedly small (in general, within the range of 0.3° to 0.5°), the rotation of the plane of polarization can be detected accurately.

In the aforesaid embodiment, the difference between the signal obtained by the addition of the output of the first photodetector 24 to the output of the second photodetector 24 and the output signal of the third photodetector 26 is detected. However, the signal detection can also be carried out by detecting the difference between the output signal of the first photodetector 24 or the second photodetector 25 and the output signal of the third photodetector 26. In this case, the output of the first photodetector 24 or the second photodetector 25 fluctuates in accordance with the tracking error. Therefore, the signal detection should preferably be carried out in the manner as in the aforesaid embodiment in order to prevent signal detection error caused by such fluctuations.

The block 12 is moved normal to or approximately normal to the direction as indicated by the arrow U by the optical system feed motor as mentioned above, whereby the incidence position (the position in the radial direction of the magneto-optical disk 13) of the light beam 15 upon the magneto-optical disk 13 is changed and the recorded signals are read out sequentially. The light beam 15 must be made to impinge accurately upon the center of the predetermined signal string (track). The tracking control for accurately maintaining the incidence position of the light beam 15 upon the optical disk 13 will be described below. When the center of the reflected light beam 15' is positioned exactly between the FGC 31 and the FGC 32, the optical amount detected by the first photodetector 24 (i.e. the photodiodes PD1 and PD2) and the optical amount detected by the second photodetector 25 (i.e. the photodiodes PD3 and PD4) coincide with each other. Therefore, in this case, the output S3 of the differential amplifier 40 becomes 0 (zero). On the other hand, when the incidence position of the light beam 15 upon the optical disk 13 becomes incorrect and the optical intensity distribution of the reflected light beam 15' is deviated upwardly in FIG. 2, the optical amount detected by the first photodetector 24 becomes larger than the optical amount detected by the second photodetector 25. Therefore, in this case, the output S3 of the differential amplifier 40 becomes "+" (plus). Conversely, when the optical intensity distribution of the reflected light beam 15' is deviated downwardly in FIG. 2, the output S3 of the differential amplifier 40 becomes "−" (minus). That is, the output S3 of the differential amplifier 40 represents the direction of the tracking error (the direction as indicated by the arrow x in FIG. 2). The output S3 is fed as a tracking error signal to the tracking coil drive control circuit 44. The technique of detecting the tracking error by processing the outputs of the photodiodes PD1 to PD4 in the manner as mentioned above has heretofore been established as the push-pull technique. Upon receiving the tracking error signal S3, the tracking coil drive control circuit 44 feeds an electric current It in accordance with the direction of the tracking error represented by the signal S3 to the tracking coil 19 for moving the objective lens 18 in a direction that cancels the tracking error. In this manner, the light beam 15 is made to impinge accurately upon the center of the signal string.

The focusing control for converging the light beam 5 accurately onto the reflection surface 14 of the magneto-optical disk 13 will be described hereinbelow. When the light beam 15 is focused accurately on the reflection surface 14 of the magneto-optical disk 13, the optical wave 15' converged by the FGC 31 is converged at the middle position between the photodiodes PD1 and PD2. At this time, the optical wave 15' converged by the FGC 32 is converged at the middle position between the photodiodes PD3 and PD4. Therefore, the output of the addition amplifier 35 and the output of the addition amplifier 36 become equal to each other, and the output S2 of the differential amplifier 39 becomes 0 (zero). On the other hand, in the case where the light beam 15 is converged at a position forward from the reflection surface 14, the reflected light beam 15' impinges in the converged form upon the FGC 31 and the FGC 32, and the incidence positions of the optical waves 15', 15' upon the first photodetector 24 and the second photodetector 25 are deviated inwardly, i.e. toward the photodiode PD2 and toward the photodiode PD3. Therefore, in this case, the output of the addition amplifier 35 becomes lower than the output of the addition amplifier 36, and the output S2 of the differential amplifier 39 becomes "−" (minus). Conversely, in the case where the light beam 15 is converged at a position backward from the reflection surface 14, the reflected light beam 15' impinges in the divergent form upon the FGC 31 and the FGC 32, and the incidence positions of the optical waves 15', 15' upon the first photodetector 24 and the second photodetector 25 are deviated outwardly, i.e. toward the photodiode PD1 and toward the photodiode PD4. Therefore, in this case, the output of the addition amplifier 35 becomes higher than the output of the addition amplifier 36, and the output S2 of the differential amplifier 39 becomes "+" (plus). Thus the output S2 of the differential amplifier 39 represents the direction of the focusing error. The output S2 is fed as a focusing error signal to the focusing coil drive control circuit 43. The technique of detecting the focusing error by processing the outputs of the photodiodes PD1 to PD4 in the manner as mentioned above has heretofore been carried out in the Foucault technique using a Foucault prism. Upon receiving the focusing error signal S2, the focusing coil drive control circuit 43 feeds an electric current If in accordance with the direction of the focusing error represented by the signal S2 to the focusing coil 20 for moving the objective lens 18 in a direction that cancels the focusing error. In this manner, the light beam 15 is made to converge accurately onto the reflection surface 14 of the magneto-optical disk 13.

In the course of advance of the light beam 15 emitted by the semiconductor laser 16 from the collimator lens 17 toward the objective lens 18, a part of the light beam 15 is taken by the FGC 31, the FGC 32 and the FGC 33 into the optical waveguide 22. Therefore, in order to prevent the light beam 15 from being reflected by an edge face 22c of the optical waveguide 22 and detected by the first photodetector 24, the second photodetector 25 and the third photodetector 26, a light absorbing member 45 should preferably be secured to the edge face 22c, or the edge face 22c should preferably be processed into a rough surface.

In the aforesaid embodiment, the FGC 31, the FGC 32 and the FGC 33 are formed so that their gratings closely contact each other. However, the FGC 31, the FGC 32 and the FGC 33 may be formed independently of each other in slightly spaced relation. This also applies to the embodiments described below.

Also, tee FGC 31 and the FGC 32 may be formed so that the optical waves 15', 15' converged by the FGC 31 and the FGC 32 intersect each other, i.e. so that the position of optical wave convergence by the FGC 31 is on the lower side of the y axis in FIG. 2 and the position of optical wave convergence by the FGC 32 is on the upper side of the y axis.

In the aforesaid embodiment, the first FGC 31 and the second FGC 32 excite the TE guided mode, and the third FGC 33 excites the TM guided mode. However, conversely, the first FGC 31 and the second FGC 32 may be formed to excite the TM guided mode, and the third FGC 33 may be formed to excite the TE guided mode. Also, the FGC 31 and the FGC 32 may be closely contacted with each other or may be disposed to close to each other, and the third FGC 33 may be disposed outward of one or both of the FGC 31 and the FGC 32.

Further embodiments of the pickup apparatus for a magneto-optical recording medium in accordance with the present invention will hereinbelow be described with reference to FIGS. 4 to 8, 10, 11 and 12. In FIGS. 4 to 8, 10, 11 and 12, similar elements are numbered with the same reference numerals with respect to FIG. 1.

Figure 4:
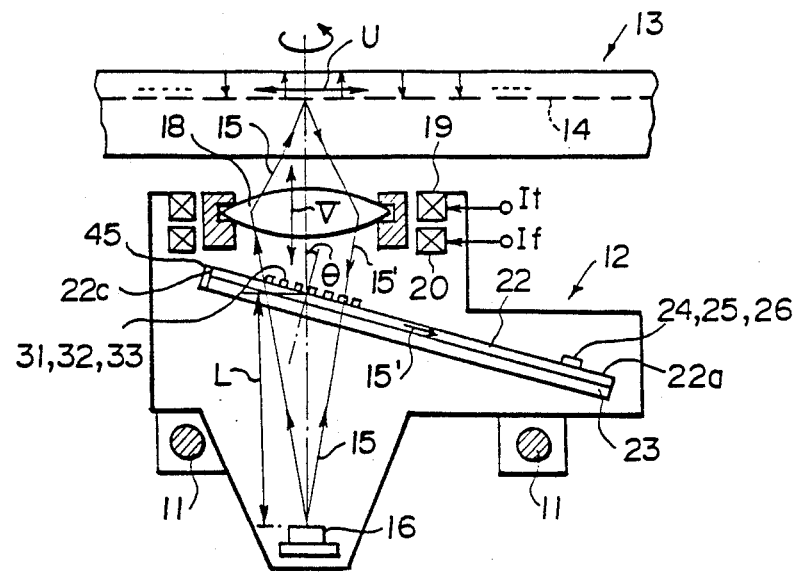

In an embodiment shown in FIG. 4, the collimator lens 17 in the embodiment shown in FIG. 1 is omitted, and the light beam 15' reflected by the magento-optical disk 13 is taken in the converged from into the optical waveguide 22. Also with this configuration, the recorded signals, tracking error and focusing error can be detected by detecting the optical waves 15', 15=, 15' converged inside of the optical waveguide 22 by the first photodetector 24, the second photodetector 25 and the third photodetector 26 of the type as shown in FIG. 2, and processing the detection signals in the manner as mentioned above.

When the positions on the optical waveguide 22 and the coordinates of the optical wave converging positions by the FGC 31 and the FGC 32 are defined in the same manner as in the embodiment shown in FIG. 1, the m'th grating pattern of each of the FGC 31 and the FGC 32 in the embodiment shown in FIG. 4 is expressed as $$\sqrt{x^2 + (y - L\sin\theta)^2 + (L\cos\theta)^2} - N_{TE}\sqrt{(x \mp Fx)^2 + (y - Fy)^2} = m\lambda + \text{const.}$$

(double signs: "−" for the FGC 31, "+" for the FGC 32)
where $\lambda$ denotes the optical wavelength of the reflected light beam 15', $\theta$ denotes the angle between the center axis of the reflected light beam 15' and the optical waveguide 22, L denotes the distance from the beam diverging point to the FGC 33 along the beam center axis as shown in FIG. 4, and $N_{TE}$ denotes the effective refractive index of the optical waveguide 22 with respect to the TE mode optical wave.

On the other hand, when the coordinates of the optical wave converging position by the FGC 33 are defined in the same manner as in the embodiment shown in FIG. 1, the m'th grating pattern of the FGC 33 is expressed as $$\sqrt{x^2 + (y - L\sin\theta)^2 + (L\cos\theta)^2} - N_{TM}\sqrt{x^2 + (y - Fy)^2} = m\lambda + \text{const.}$$

where $N_{TM}$ denotes the effective refractive index of the optical waveguide 22 with respect to the TM mode optical wave, and the other factors are as defined just above with reference to FIG. 4.

Figure 5:
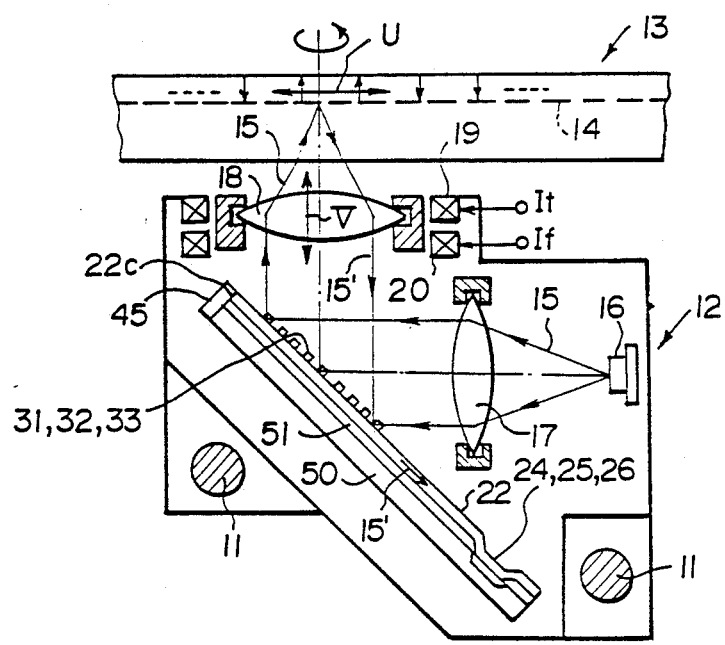

In an embodiment shown in FIG. 5, a support 50 is formed of a material exhibiting a substantially large refractive index, and the light beam 15 is reflected by the boundary between the support 50 and a buffer layer 51 toward the magneto-optical disk 13. Also in this case, the light beam 15' reflected by the magento-optical disk 13 is introduced by the FGC 31, the FGC 32 and the FGC 33 into the optical waveguide 22.

Figure 6:
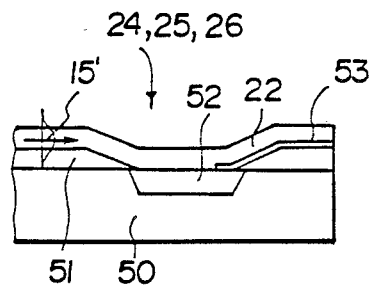
FIG. 6 is a side view showing the photodetector in the embodiment shown in FIG. 5, FIGS. 7 and 8 are side views showing still further embodiments of the pickup apparatus for a magneto-optical recording medium in accordance with the present invention.

With the configuration as shown in FIG. 5, the support 50 need not be formed of a transparent member. Therefore, in this case, it becomes possible to form the support 50 by use of, for example, an n type Si support, to dispose the buffer layer 51 for preventing the spreading-out optical wave (evanescent optical wave) of the optical waves 15', 15' which are being guided through the optical waveguide 22 from entering the support 50, and to integrate the photodiodes PD1 to PD5 by the provision of a p type Si layer 52 and an electrode 53 as shown in FIG. 6. The photodiodes PD1 to PD5 integrated in this manner are advantageous from the viewpoint of achieving quick response.

Figure 7:
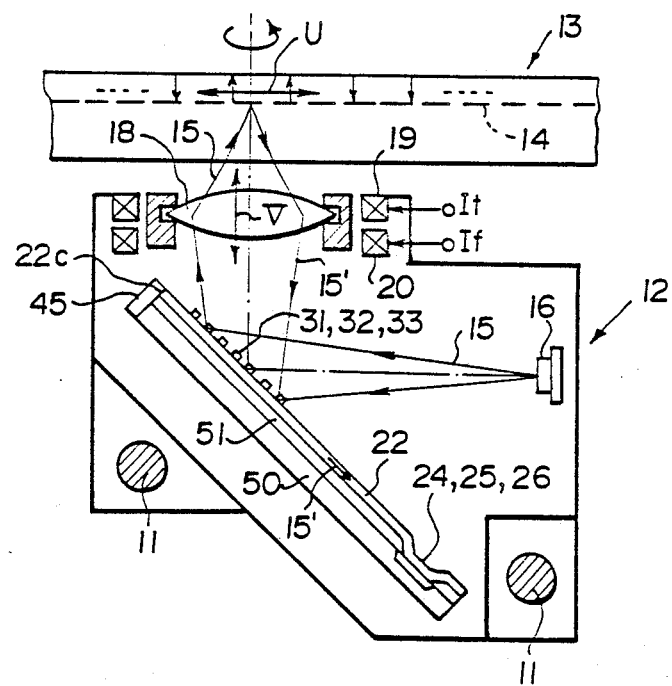

In an embodiment shown in FIG. 7, the light beam 15 emitted by the semiconductor laser 16 in the divergent form is reflected in this form by the boundary between the support 50 and the buffer layer 51 toward the magneto-optical disk 13.

Figure 8:
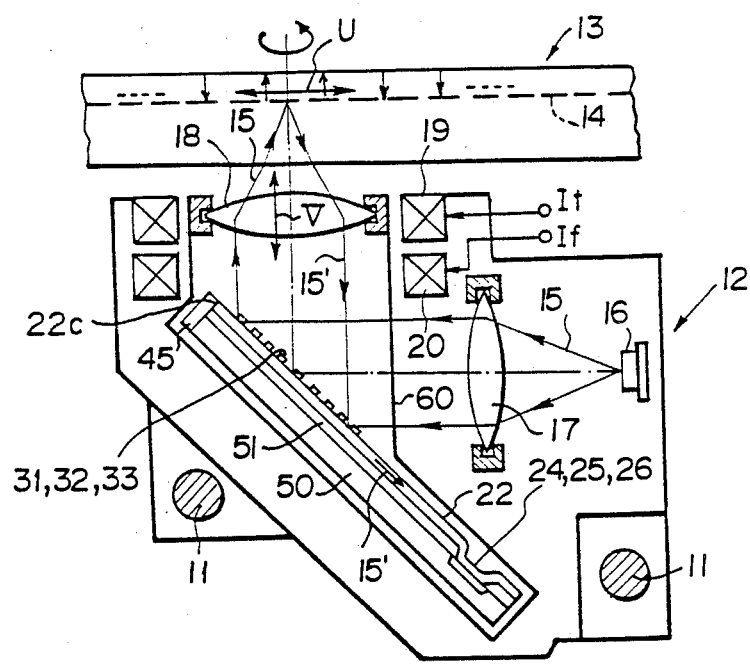

In an embodiment shown in FIG. 8, the optical waveguide 22 and the objective lens 18 are secured to a single head 60, and the head 60 is supported moveably in the tracking direction and in the focusing direction with respect to the block 12. The head 60 is moved by the tracking coil 19 and the focusing coil 20. Specifically, in this embodiment, the optical waveguide 22 is moved together with the objective lens 18 for the purposes of tracking control and focusing control. With this configuration, the problem that the objective lens 18 is deviated from the optical waveguide 22 in the course of tracking control as in the case where the objective lens 18 alone is moved can be eliminated, and tracking control can be carried out more accurately.

In the embodiment shown in FIG. 8, the light beam 15 reflected by the boundary between the support 50 and the buffer layer 51 is made to impinge upon the magneto-optical disk 13. However, also in the case where the optical waveguide 22 and the objective lens 18 are moved integrally with each other as mentioned above, it is possible to constitute the apparatus so that the light beam 15 passing through the optical waveguide 22 impinges upon the magneto-optical disk 13, or to constitute the apparatus so that the light beam115 passes through the optical waveguide 22 in the divergent form or is reflected in the divergent form by the boundary between the support 5 and the buffer layer 51. Also, besides the optical waveguide 22 and the objective lens 18, the semiconductor laser 16 and the collimator lens 17 may be secured to the head 60 and may be moved integrally with the optical waveguide 22 and the objective lens 18.

Figure 10:
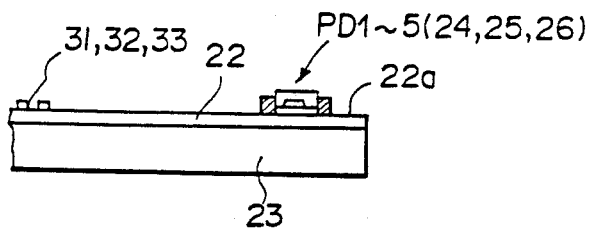
FIGS. 10, 11 and 12 are side views showing further examples of the photodetector used in the pickup apparatus for a magneto-optical recording medium in accordance with the present invention.
Figure 11:
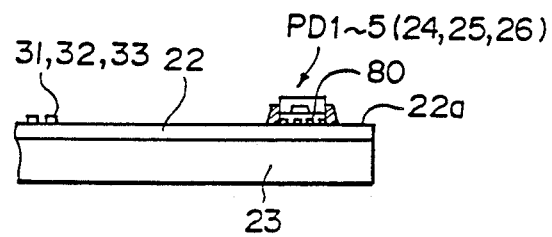
Figure 12:
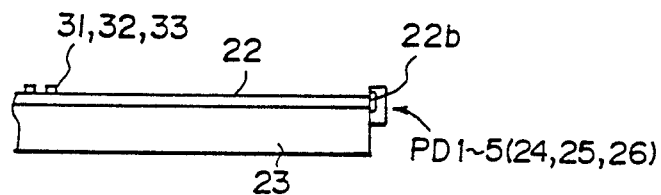

In the aforesaid five embodiments, the first photodetector 24, the second photodetector 25 and the third photodetector 26 are secured to or integrated with the surface 22a of the optical waveguide 22. However, the first photodetector 24, the second photodetector 25 and the third photodetector 26 may be disposed in any other manner on the optical waveguide 22. For example, as shown in FIG. 10, the photodetectors 24, 55 and 26 may be disposed close to the surface 22aof the optical waveguide 22. Also, in the case where the photodetectors 24, 25 and 26 are disposed close to the surface 22a of the optical waveguide 22 in this manner, a diffraction grating 80 for radiating the guided optical waves (reflected light beam) 15', 15', 15' out of the optical waveguide 22 may be disposed on the surface 22a of the optical waveguide 22 as shown in FIG. 11, thereby to improve the light receiving efficiencies of the photodetectors 24, 25 and 26. Further, as shown in FIG. 12, the photodetectors 24, 25 and 26 may be closely contacted with an edge face 22b of the optical waveguide 22 after the edge face 22b is polished.

Besides the aforesaid method of making the FGC 31, the FGC 32 and the FGC 33, they can be formed by the planar technique by use of a known photolithographic method, a known holographic transfer method or the like, and can be easily mass-produced through duplication.

We claim:

1. A pickup apparatus for a magneto-optical recording medium, which comprises:
    (i) a light source for irradiating a linearly polarized light beam onto a surface of a magneto-optical recording medium,
    (ii) an objective lens for converging said light beam onto the reflection surface of said magneto-optical recording medium,
    (iii) an optical waveguide disposed in such a direction that one surface thereof receives the light beam reflected by said magneto-optical recording medium,
    (iv) a first focusing grating coupler and a second focusing grating coupler disposed side by side at an incidence position of said reflected light beam on the surface of said optical waveguide so that an axis passing through approximately the center of said reflected light beam and extending on said surface of said optical waveguide approximately normal to a tracking direction intervenes between said first focusing grating coupler and said second focusing grating coupler, said first focusing grating coupler and said second focusing grating coupler respectively making said reflected light beam enter said optical waveguide by exciting either one of a TE guided mode and a TM guided mode, and respectively converging the optical waves, which are thus guided through said optical waveguide in the guided modes identical with each other, to positions spaced from each other with said axis intervening therebetween,
    (v) a third focusing grating coupler disposed side by side with said first focusing grating coupler and said second focusing grating coupler at the incidence position of said reflected light beam on the surface of said optical waveguide, said third focusing grating coupler making said reflected light beam enter said optical waveguide by exciting a guided mode different from said guided modes of said first focusing grating coupler and said second focusing grating coupler, and converging the optical wave, which is thus guided through said optical waveguide, in said optical waveguide,
    (vi) a first photodetector, a second photodetector, and a third photodetector secured to the surface or an edge face of said optical waveguide for respectively detecting the optical wave converged by said first focusing grating coupler, the optical wave converged by said second focusing grating coupler, and the optical wave converged by said third focusing grating coupler,
    (vii) an error detection circuit for carrying out detection of tracking error and detection of focusing error on the basis of outputs of said first photodetector and said second photodetector, and (viii) a differential detection circuit for detecting signals recorded on said magneto-optical recording medium on the basis of a difference between the output of said first photodetector and/or the output of said second photodetector on one hand and an output of said third photodetector on the other hand.

2. An apparatus as defined in claim 1 wherein said optical waveguide is disposed so that a plane, on which said axis and a center axis of said reflected light beam lie, and the direction of polarization of said reflected light beam are inclined at an angle of approximately 45° with respect to each other.

3. An apparatus as defined in claim 1 wherein said third focusing grating coupler is disposed between said first focusing grating coupler and said second focusing grating coupler.

4. An apparatus as defined in claim 2 wherein said third focusing grating coupler is disposed between said first focusing grating coupler and said second focusing grating coupler.

5. An apparatus as defined in claim 1 wherein said first photodetector and said second photodetector are respectively composed of two photodetectors divided from each other by a gap extending approximately in parallel with said axis so that detection of tracking error can be effected by a push-pull technique and detection of focusing error can be effected by a Foucault technique.

6. An apparatus as defined in claim 2 wherein said first photodetector and said second photodetector are respectively composed of two photodetectors divided from each other by a gap extending approximately in parallel with said axis so that detection of tracking error can be effected by a push-pull technique and detection of focusing error can be effected by a Foucault technique.

7. An apparatus as defined in claim 3 wherein said first photodetector and said second photodetector are respectively composed of two photodetectors divided from each other by a gap extending approximately in parallel with said axis so that detection of tracking error can be effected by a push-pull technique and detection of focusing error can be effected by a Foucault technique.

8. An apparatus as defined in claim 4 wherein said first photodetector and said second photodetector are respectively composed of two photodetectors divided from each other by a gap extending approximately in parallel with said axis so that detection of tracking error can be effected by a push-pull technique and detection of focusing error can be effected by a Foucault technique.

9. An apparatus as defined in claim 1 wherein a support of said optical waveguide is formed of a transparent member, and said optical waveguide is disposed between said light source and said objective lens.

10. An apparatus as defined in claim 2 wherein a support of said optical waveguide is formed of a transparent member, and said optical waveguide is disposed between said light source and said objective lens.

11. An apparatus as defined in claim 3 wherein a support of said optical waveguide is formed of a transparent member, and said optical waveguide is disposed between said light source and said objective lens.

12. An apparatus as defined in claim 4 wherein a support of said optical waveguide is formed of a transparent member, and said optical waveguide is disposed between said light source and said objective lens.

13. An apparatus as defined in claim 5 wherein a support of said optical waveguide is forced of a transparent member, and said optical waveguide is disposed between said light source and said objective lens.

14. An apparatus as defined in claim 6 wherein a support of said optical waveguide is formed of a transparent member, and said optical waveguide is disposed between said light source and said objective lens.

15. An apparatus as defined in claim 7 wherein a support of said optical waveguide is formed of a transparent member, and said optical waveguide is disposed between said light source and said objective lens.

16. An apparatus as defined in claim 8 wherein a support of said optical waveguide is formed of a transparent member, and said optical waveguide is disposed between said light source and said objective lens.

17. An apparatus as defined in claim 1 wherein a buffer layer is disposed between said optical waveguide and a support of said optical waveguide, and said optical waveguide is disposed so that said light beam emitted by said light source is reflected by a boundary between said buffer layer and said support toward said magneto-optical recording medium.

18. An apparatus as defined in claim 2 wherein a buffer layer is disposed between said optical waveguide and a support of said optical waveguide, and said optical waveguide is disposed so that said light beam emitted by said light source is reflected by a boundary between said buffer layer and said support toward said magneto-optical recording medium.

19. An apparatus as defined in claim 3 wherein a buffer layer is disposed between said optical waveguide and a support of said optical waveguide, and said optical waveguide is disposed so that said light beam emitted by said light source is reflected by a boundary between said buffer layer and said support toward said magneto-optical recording medium.

20. An apparatus as defined in claim 4 wherein a buffer layer is disposed between said optical waveguide and a support of said optical waveguide, and said optical waveguide is disposed so that said light beam emitted by said light source is reflected by a boundary between said buffer layer and said support toward said magneto-optical recording medium.

21. An apparatus as defined in claim 5 wherein a buffer layer is disposed between said optical waveguide and a support of said optical waveguide, and said optical waveguide is disposed so that said light beam emitted by said light source is reflected by a boundary between said buffer layer and said support toward said magneto-optical recording medium.

22. An apparatus as defined in claim 6 wherein a buffer layer is disposed between said optical waveguide and a support of said optical waveguide, and said optical waveguide is disposed so that said light beam emitted by said light source is reflected by a boundary between said buffer layer and said support toward said magneto-optical recording medium.

23. An apparatus as defined in claim 7 wherein a buffer layer is disposed between said optical waveguide and a support of said optical waveguide, and said optical waveguide is disposed so that said light beam emitted by said light source is reflected by a boundary between said buffer layer and said support toward said magneto-optical recording medium.

24. An apparatus as defined in claim 8 wherein a buffer layer is disposed between said optical waveguide and a support of said optical waveguide, and said optical waveguide is disposed so that said light beam emitted by said light source is reflected by a boundary between said buffer layer and said support toward said magneto-optical recording medium.

25. An apparatuses defined in any of claims 1 to 24 wherein said optical waveguide and said objective lens are disposed independently of each other, and said objective lens alone is moved for the purposes of tracking control and focusing control.

26. An apparatus as defined in any of claims 1 to wherein said optical waveguide is disposed integrally with said objective lens and is moved together with said objective lens for the purposes of tracking control and focusing control.

* * * * *